April 11, 1967  C. ROCH  3,313,029
LOCKING DEVICE FOR A MICROMETER SCREW
Filed July 22, 1965
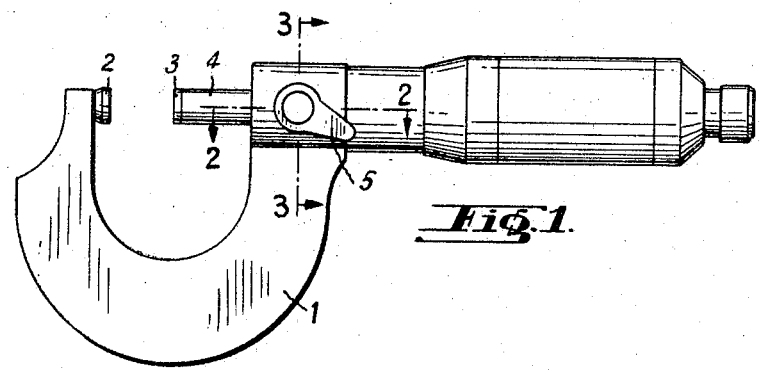
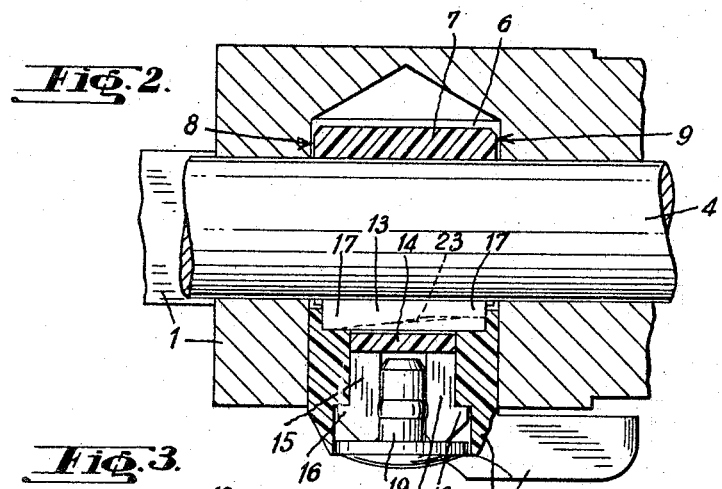
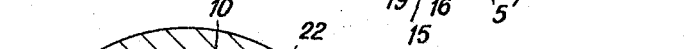
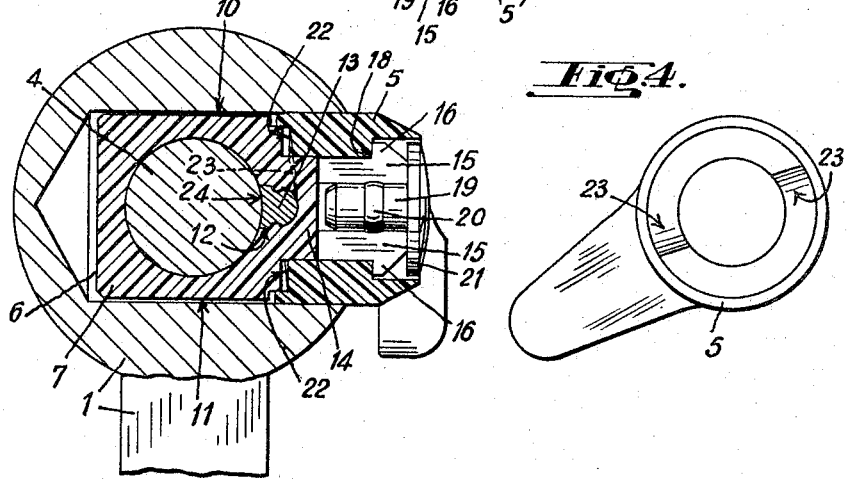
INVENTOR
CHARLES ROCH
By Young & Thompson
ATTYS.

United States Patent Office 3,313,029
Patented Apr. 11, 1967

3,313,029
LOCKING DEVICE FOR A MICROMETER
SCREW
Charles Roch, Rolle, Vaud, Switzerland, assignor to
Pierre Roch S.a.r.l., Rolle, Vaud, Switzerland, a corporation of Switzerland
Filed July 22, 1965, Ser. No. 473,951
Claims priority, application Switzerland, July 24, 1964,
9,728/64
5 Claims. (Cl. 33—164)

Devices are already known which serve to lock in a chosen position the screw of a micrometer, but they have the disadvantage of being costly and, moreover, of exerting on the screw asymmetric stresses which are harmful in such accurate and delicate instruments as micrometers.

The present invention aims at overcoming these disadvantages and concerns a locking device for a micrometer screw, comprising a gripping body of plastic material, disposed in an opening of the micrometer body which is traversed by a cylindrical part integral with said screw, with a side clearance just sufficient for its easy insertion in and withdrawal from this opening, this body having a housing in which is disposed a metallic packing strip adapted to press against a portion of the periphery of said cylindrical part, the remainder of this periphery being surrounded by the gripping body, free from the latter with a clearance just sufficient to ensure the movement of said cylindrical part without any substantial friction in the gripping body, and comprising further a rotatable control member, actuated by hand, between a loosened position and a locked position of the screw, this member having a part forming a cam, to come into the locking position, on the one hand, to press the packing strip against the above mentioned cylindrical part and, on the other hand, to press the diametrically opposed part of the gripping body against the cylindrical part in question, which is immobilized under the influence of an action exerting itself symmetrically thereon, whereas the control member, which, in the free state, is disposed with a small clearance in the above mentioned opening, is subjected to a compression stress which deforms it by causing said clearance to disappear completely, thus immobilizing said member and with it the gripping body relative to the micrometer body.

The accompanying drawing shows, by way of example, one embodiment of the device according to the invention.

FIG. 1 is a view as a whole of a micrometer provided with this embodiment of the locking device.

FIG. 2 is a view in partial longitudinal section, on a larger scale, along 2—2 of FIG. 1.

FIG. 3 is a section along 3—3 of FIG. 1, corresponding to FIG. 2.

FIG. 4 shows a detail view of the actuating member.

FIG. 1 shows, side-view, a micrometer of which one sees at 1 the body, at 2 the fixed contact and at 3 the movable contact located at the end of a cylindrical rod 4 integral with the micrometric screw not visible in the drawing. At 5 one sees the control member of the locking device of the micrometric screw, device which will be described with reference to FIGS. 2 to 4.

The body 1 has a cavity or opening 6 which is traversed by the cylindrical rod 4 integral with the micrometric screw. A gripping body 7, of plastic material, is disposed in the cavity 6 with a side clearance at 8, 9, 10 and 11, for the easy insertion of this gripping body in said cavity, and for its easy removal from the said cavity. This gripping body has a housing 12 in which is disposed with suitable clearance a packing strip 13, metallic, preferably of calcined material, adapted to press against a portion of the periphery of the cylindrical rod 4, through its face 24 of cylindrical shape forming a brake-shoe. The remainder of the periphery of the rod 4 is surrounded by the body 7, as is best seen in FIG. 3. In the free state of this body 7, the latter surrounds the rod 4 with a clearance just sufficient to ensure the movement of said rod without substantial friction in the body 7.

The body 7 has a cylindrical part 14 the axis of which is perpendicular to that of the rod 4. This part 14 is prolonged by flexible arms 15 ending in hooks 16 the function of which will be explained hereafter. The ends of the packing strip 13 emerge from the body 7, at 17 (FIG. 2).

The device also comprises a control member 5 already mentioned, of plastic material, having a handle for its manual operation, by rotation about its own axis, between a position of rest and a locking position, and vice versa. The member 5 is of general cylindrical shape, pierced axially. It is partly engaged on the cylindrical part 14, to rotate on the same. It has inside a shoulder 18 adapted to cooperate with the hooks 16, to hold the member 5 on the body 7, while at the same time allowing it to rotate relative to the latter.

The arms 15 are immobilized in the working position by a stop member 19, of plastic material, which is inserted between said arms. This member has an annular rim 20 forming a stop notch when it arrives opposite corresponding notches in the arms 15. The stop member 19 has a head 21 which permits its easy removal when it is desired to dismantle the device described.

The control member has, at its end adjacent to 7, an annular end portion 22 having a part forming a cam and having the shape of two diametrically opposed helicoidal slopes 23 (FIG. 4) and adapted to cooperate with the ends 17 of the packing strip 13.

The operation of the device described is the following.

When one rotates the control member 5, by manually operating its handle, to cause it to pass from its position of rest to its locking position, each of the two cam surfaces 23 of the control member press against one of the parts 17 of the packing strip 13, which has for effect to press it against the periphery of the rod 4. But at the same time, by reaction, the shoulder 18 of the member 5 presses on the hooks 16, which has for effect to exert a pull in the arms 15 and to apply the part of the body 7 diametrically opposed to the packing strip, against the rod 4. This latter is thus subjected to a double pressure action exerted symmetrically, which avoids any deformation of said rod and of the micrometric screw.

But the material of the member 5 is also compressed between the hooks 16 and the packing strip 17. This member thus undergoes a radial flexible deformation which causes the disappearance of any clearance between said member and the wall of the cavity 6. Thus, this control member (and with it the gripping body and the micrometric screw) is completely immobilized relative to the body of the micrometer. Any movement due to a clearance is impossible.

The elements 5, 7 and 19 being of plastic material, their cost is very low, in comparison with metallic elements of the same shape.

What I claim is:

1. A locking device for a micrometer screw, comprising a gripping body of deformable plastic material, disposed in an opening of the micrometer body which is traversed by a cylindrical part integral with said screw, with a side clearance just sufficient for its easy insertion in and withdrawal from this opening, said gripping body having a housing in which is disposed a metallic packing strip adapted to press against a portion of the periphery of said cylindrical part, the remainder of this periphery being surrounded by the gripping body, free from the latter with a clearance just sufficient to ensure the movement of said cylindrical part without any substantial friction in the gripping body, and comprising further a deformable rotatable control member, actuated by hand, between a loosened position and a locked position of the screw, said member having a part forming a cam, to come into the locking position, on the one hand, to press the packing strip against the above mentioned cylindrical part and, on the other hand, to press the diametrically opposed part of the gripping body against the cylindrical part in question, which is immobilized under the influence of an action exerting itself symmetrically thereon, whereas the control member, which, in the free state, is disposed with a small clearance in the above mentioned opening, is subjected to a compression stress which deforms it by causing said clearance to disappear completely, thus immobilizing said member and with it the gripping body relative to the micrometer body.

2. A device according to claim 1, wherein the control member is an element of deformable plastic material of general cylindrical shape the axis of which is perpendicular to that of the screw to be locked, said element having the part forming a cam made in its end face adjacent to the locking body.

3. A device according to claim 1, wherein the packing strip is metallic.

4. A device according to claim 2, wherein the control member has a cylindrical recess which, at its end adjacent to the gripping body, is mounted to rotate on a corresponding cylindrical part of the gripping body.

5. A device according to claim 4, wherein the gripping body and the control member are held one to the other by parts of the former forming flexible hooks, which are immobilized by a stop member the removal of which frees said hooks.

References Cited by the Examiner

UNITED STATES PATENTS

| | | | |
|---|---|---|---|
| 2,856,694 | 10/1958 | Bianco | 33—164 |
| 2,932,898 | 4/1960 | Enders | 33—164 |
| 2,943,395 | 7/1960 | Soucy | 33—164 |
| 3,046,420 | 7/1962 | Mesicah | 33—164 |

FOREIGN PATENTS 605,420   7/1948   Great Britain.

LEONARD FORMAN, *Primary Examiner.*

W. D. MARTIN, *Assistant Examiner.*